United States Patent [19]

Dvorak

[11] 4,344,730
[45] Aug. 17, 1982

[54] EGG TRANSFER APPARATUS

[76] Inventor: Lester I. Dvorak, Rte. 1, Box 90F, Little Mountain, S.C. 29075

[21] Appl. No.: 173,417

[22] Filed: Jul. 29, 1980

[51] Int. Cl.³ .............................................. B65G 65/30
[52] U.S. Cl. .................................................. 414/405
[58] Field of Search ................................ 414/403, 405

[56] References Cited

U.S. PATENT DOCUMENTS 2,164,222  6/1939  Rietfort ............................... 414/405
2,410,163  10/1946  Howard ............................. 414/405

*Primary Examiner*—Robert G. Sheridan
*Attorney, Agent, or Firm*—Dority & Flint

[57] ABSTRACT

Apparatus for transferring eggs from an incubator setter tray having individualized compartments in which the eggs are contained to a hatcher tray in which the eggs are loose and co-mingled. The apparatus includes a main floor supported frame and a secondary frame rotatably carried by the main frame with carrier means affixed to the secondary rotating frame for holding and retaining the setter tray and hatcher tray in a superposed manner whereby one of the trays may be moved into an egg transfer position in relation to the other whereupon the secondary frame is rotated 180 degrees to transfer the eggs from the setter tray to the hatcher tray. The sequence may be automated for precision and reliability.

10 Claims, 12 Drawing Figures

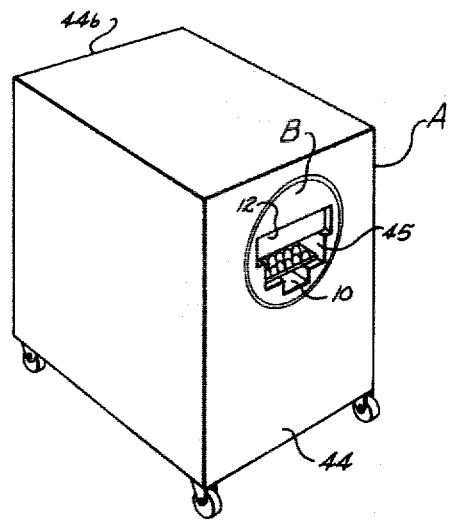
Fig.1
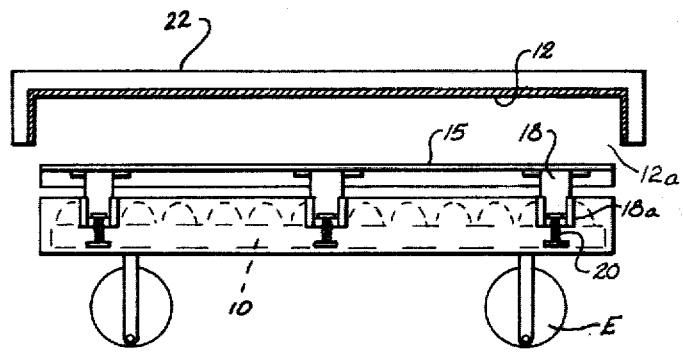 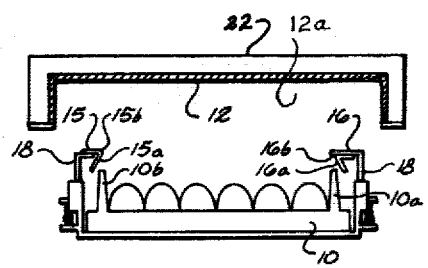
Fig.2    Fig.2a
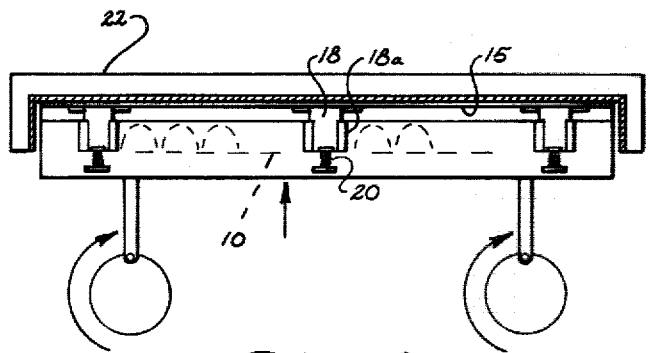 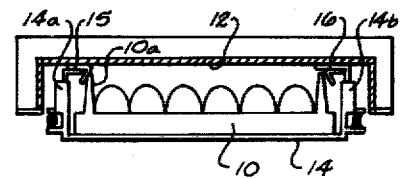
Fig.3    Fig.3a
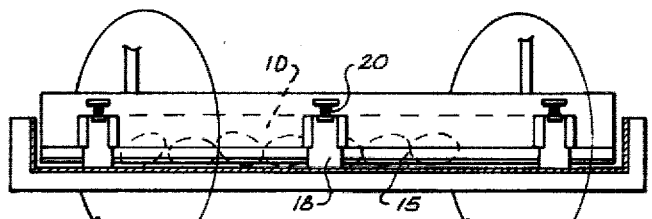 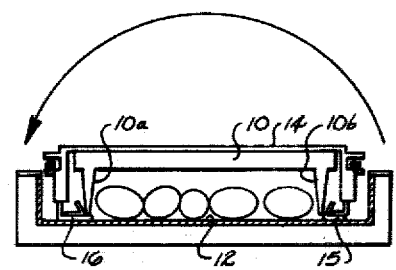
Fig.4    Fig.4a

EGG TRANSFER APPARATUS

BACKGROUND OF THE INVENTION

In the incubation and hatching of chicken eggs, it is normally required that the eggs be contained in trays having individual egg compartments for a number of days. For the final two days of incubation, the eggs must be placed in hatcher trays which are typically rectangular and completely open so that adequate space is afforded for the hatching of the chicks. Heretofore, it has been practiced to manually transfer the eggs from the setter tray to the hatcher tray either individually or simultaneously. The latter normally requires the presence of two attendants and often results in egg breakage.

Accordingly, an important object of the present invention is to provide an apparatus for transferring eggs from a setter tray to a hatcher tray in a quick and reliable manner which can be operated by a single attendant.

Yet another important object of the present invention is to provide apparatus for transferring eggs from a setter tray to a hatcher tray which ensures that the trays are moved closely together in an egg transfer position before transferring the eggs between trays.

Still another important object of the present invention is to provide an apparatus for transferring eggs from a setter tray to a hatcher tray which may be easily automated to eliminate any inaccuracies in the positioning of the trays and transfer of eggs.

SUMMARY OF THE INVENTION

It has been found that apparatus for transferring incubator eggs from a setter tray to a hatcher tray may be had by providing a main frame and a secondary frame rotatably carried by the main frame wherein the setter and hatcher trays may be carried by the secondary frame in a manner where one of the trays is movable to an egg transfer position with respect to the other tray whereupon the secondary frame is rotated 180 degrees to complete the transfer of the eggs to the hatcher tray. The apparatus includes retaining rails for retaining the setter tray while providing release and transfer of the eggs into the hatcher tray without hangups or interference from the retaining rails.

BRIEF DESCRIPTION OF THE DRAWINGS

FIG. 1 is a perspective view of apparatus for transferring eggs from a setter tray to a hatcher tray according to the invention;

FIG. 2 is a schematic side view of carrier means for supporting a setter tray and a hatcher tray according to the invention wherein the carrier means is positioned in a start position;

FIG. 2a is an end view of FIG. 2;

FIG. 3 is a schematic side view illustrating the carrier means of FIG. 2 in an egg transfer position;

FIG. 3a is an end view of FIG. 3;

FIG. 4 is a schematic view illustrating a carrier means of FIG. 3 when rotated 180 degrees to a reverse position in which the eggs are transferred into a hatcher tray;

FIG. 4a is an end view of FIG. 4;

DESCRIPTION OF A PREFERRED EMBODIMENT

Figures 5, 5A:
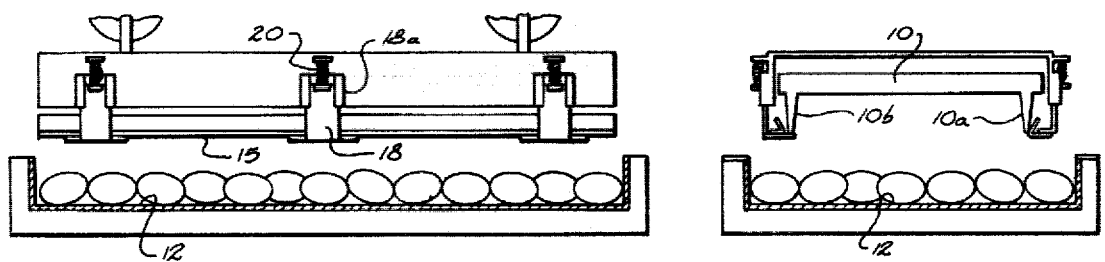
FIG. 5 is a schematic view illustrating the carrier means of FIG. 4 with the movable carrier means retracted to its original position.
FIG. 5a is an end view of FIG. 5.

Apparatus for transferring eggs from an incubator setter tray having compartments in which eggs are individually contained to a hatcher tray in which the eggs are loosely comingled and contained includes a main frame A and a secondary frame B which is rotatably carried by the main frame. A first tray carrier means C is carried by the secondary frame for holding the setter tray 10. A second tray carrier means D is carried by the secondary frame means for holding the hatcher tray 12 adjacent the setter tray. The hatcher tray has an open top 12a which is positioned by the carrier means to generally co-extend with the setter tray in a superposed position. One of the first and second tray carriers is carried by the secondary frame means so as to be movable towards the other of the tray carriers. A first drive means is provided for moving the movable tray carrier means to an egg transfer position relative to the other tray carrier means. The secondary frame means is rotatably carried by the main frame means and a second drive means is provided for rotating the secondary frame means to reverse the respective positions of the setter and hatcher trays following movement of the movable tray carrier means to the egg transfer position whereby transfer of the eggs is completed.

Referring now in more detail to the drawings, the first tray carrier means C is illustrated as including a platform 14 having spaced upstanding side frame portions 14a and 14b having upper marginal edges. Tray retaining means are carried adjacent the marginal edges of the side frame for retaining the setter tray during rotation. As illustrated, the retaining means includes longitudinal rails 15 and 16 carried adjacent marginal edges of respective side frames 14a and 14b. The retaining rails extend inwardly of the setter tray 12 towards one another. Rail 15 includes a downwardly extending flange portion 15a which joins the flange 15 at a rounded nose portion 15b.

Rail 16 includes a downwardly extending flange portion 16a and a lip portion 16b which positively engages an upstanding portion 10a of the setter tray 10. As illustrated, the rails 15 and 16 and their components are carried by an upstanding leg 18 which is vertically movable and carried on respective side frames by means of a bracket 18a in which leg 18 slides. Tabs 19a are affixed to the side frames to which a bolt 19 is affixed. A tab 18b affixed to leg 18 slides over bolts 19 via an opening therein. Spring 20 is received over bolt 19 and biases the rail upwards. In this manner, adequate clearance is provided and a variety of setter tray sizes may be easily inserted and accommodated on the platform 14. Once the setter and hatcher trays are moved to the egg transfer position, as best seen in FIG. 3a, the rails 15 and 16 are depressed against the upstanding portions 10a of the tray 10 so as to engage tightly and retain the tray against vertical movement as the tray is wedged between inclined flanges 15a and 16a.

The rounded nose 15b allows the eggs in the setter tray 10 to be transferred out of the tray smoothly and without interference or hangup as would otherwise occur if the edge was sharp. This is due to the fact that rail 15 is located on the lower rotational side of the tray as it is rotated counterclockwise tending to ledge the eggs on that side of the tray between the side and rail under gravity. The nose and inclined flange configuration of the rail allow the eggs to be released from the tray smoothly.

The second tray carrier means D includes an inverted C-shaped housing 22 having a lip portion 22a on which the hatcher tray 12 slides and is retained vertically when inserted in the housing 22 in an upside down configuration. The housing 22 is attached to circular plates 24 and 25 of the secondary frame means by any suitable means such as bolts or welding.

The secondary frame means B is completed by a lower C-shaped housing 26 extending between circular plates 24 and 25 which is likewise affixed at its ends to the plates by welding and the like. The lower housing 26 includes spaced sideframes 26a and 26b. Circular plates 24 and 25 and housings 22 and 26 affixed therebetween result in a drum-type frame which rotates between main frame sides 44 and 44b circular opening 44a as will be described hereinafter.

In the preferred embodiment, the first tray carrier means C is the movable carrier means which moves the setter tray 10 inside the inverted hatcher tray 12 to the egg transfer position as illustrated. The first drive means for moving the platform 14 and setter tray 10 includes a conventional electric motor 28, affixed to housing 26 having an output drive shaft 28a to which sprocket drives 29 and 29a are affixed. The drive sprockets are preferably affixed by means of a conventional slip clutch unit 29b. A pair of intermediate drive shafts 30 and 32 are rotatably carried by means of suitable bearings between side walls 26a and 26b which have affixed thereon driven sprockets 30a and 32a, respectively. The drive sprockets 29 and 29a are connected by means of chains 30b and 32b, respectively to the driven sprockets. It has been found that the positive drive and positioning afforded by the chain and sprocket drive is an expedient to the proper positioning of the tray carriers and trays in arriving accurately at the egg transfer position and in avoiding jamming of mechanisms due to mispositioning.

Carried on the ends of intermediate drive shaft 30 and 32 extending through the side walls of the housing 26 are eccentric crank means E which are connected to the bottom of platform 14 for effecting vertical reciprocation of the platform and first carrier means. The eccentric crank means includes circular crank plates 34 and 35 carried on opposing ends of intermediate drive shaft 32 and circular crank plates 36 and 37 (not shown) carried on opposing ends of the intermediate drive shaft 30. The circular plates have a pivotable lever 34a, 35a, 36a and 37a (not shown), respectively, eccentrically pivotally connected to the plates which is pivotably connected to the platform by means of a pivot such as 34b and 35b illustrated in FIG. 6. Each pivot is secured by means of an L-shaped bracket 38 to the bottom of platform 14. The plates rotate in the directions indicated by the arrows in the drawings to effect the reciprocating vertical movement of the platform and tray. Plates 34 and 36 also form cam plates having respective cam surfaces whose functions will be explained hereinafter. A guide post 39 is affixed to platform 14 and slides in a bushing 41 carried by means of bracket 41a between sidewalls 26a and 26b.

The secondary frame B is rotatably carried by the main frame A by means of a plurality of circumferentially spaced rollers 40 affixed to the back of front side 44 of frame A which rotatably engage the circumference of circular plate 25 and a plurality of like spaced rollers 42 affixed to the opposing back side 44b of frame A which rotatably engage the circumference of circular plate 24. An opening 44a is provided in the front side of main frame A for removal and insertion of the trays and opening 45 is provided in circular plate 25 aligned with opening 44a for inserting and removing the trays from the secondary frame B.

The second drive means for rotating the secondary drum frame B is provided by a conventional reversible electric motor 46 having an output drive shaft 46a having a drive pulley 47 affixed to the end thereof. A driven shaft 48 is connected to the plate 24 of secondary frame B by means of a hub 48a and rotatably mounted in a bearing block 50. The remote end of shaft 48 has affixed thereto a large diameter driven pulley 52 which is connected to the drive pulley 47 by means of a belt 53. The motor 46 may be mounted by any suitable means to a portion of the main frame A which may include bracket 46a affixed to frame A.

Figure 6:
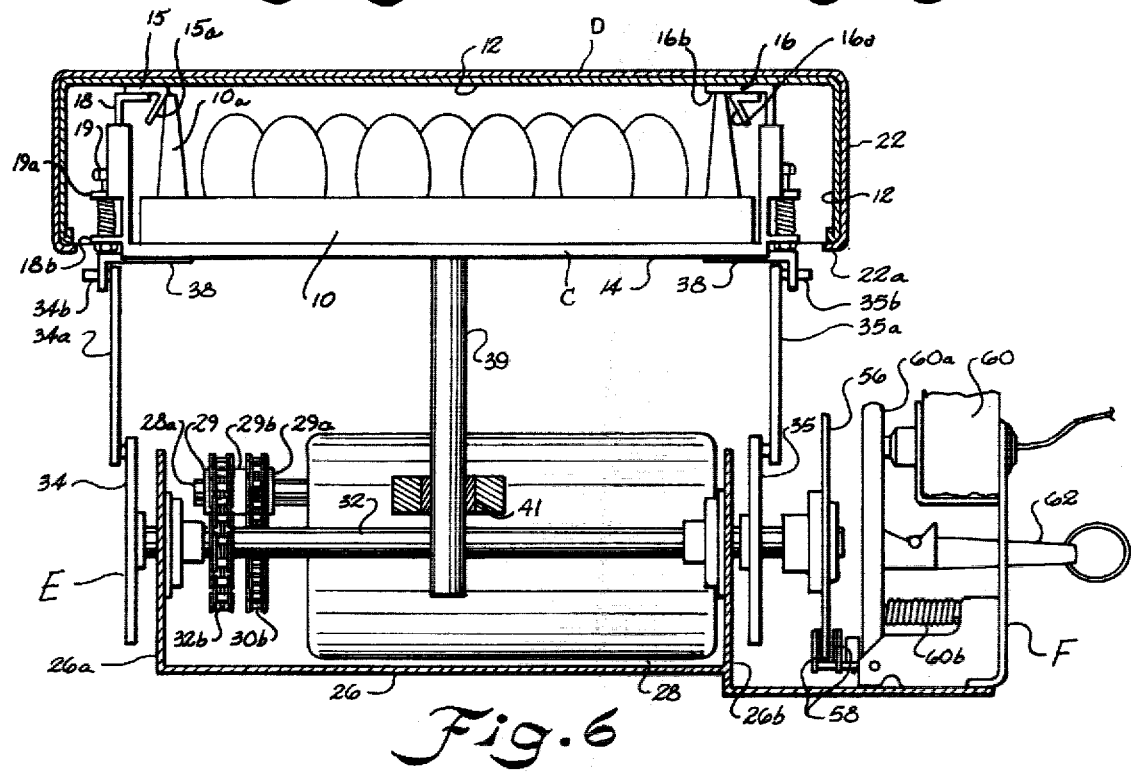
FIG. 6 is a sectional elevational view illustrating the secondary frame of apparatus constructed according to the invention which supports the setter and hatcher trays and carriers for the respective trays and the drive for moving the trays into and out of egg transfer position.
Figure 7:
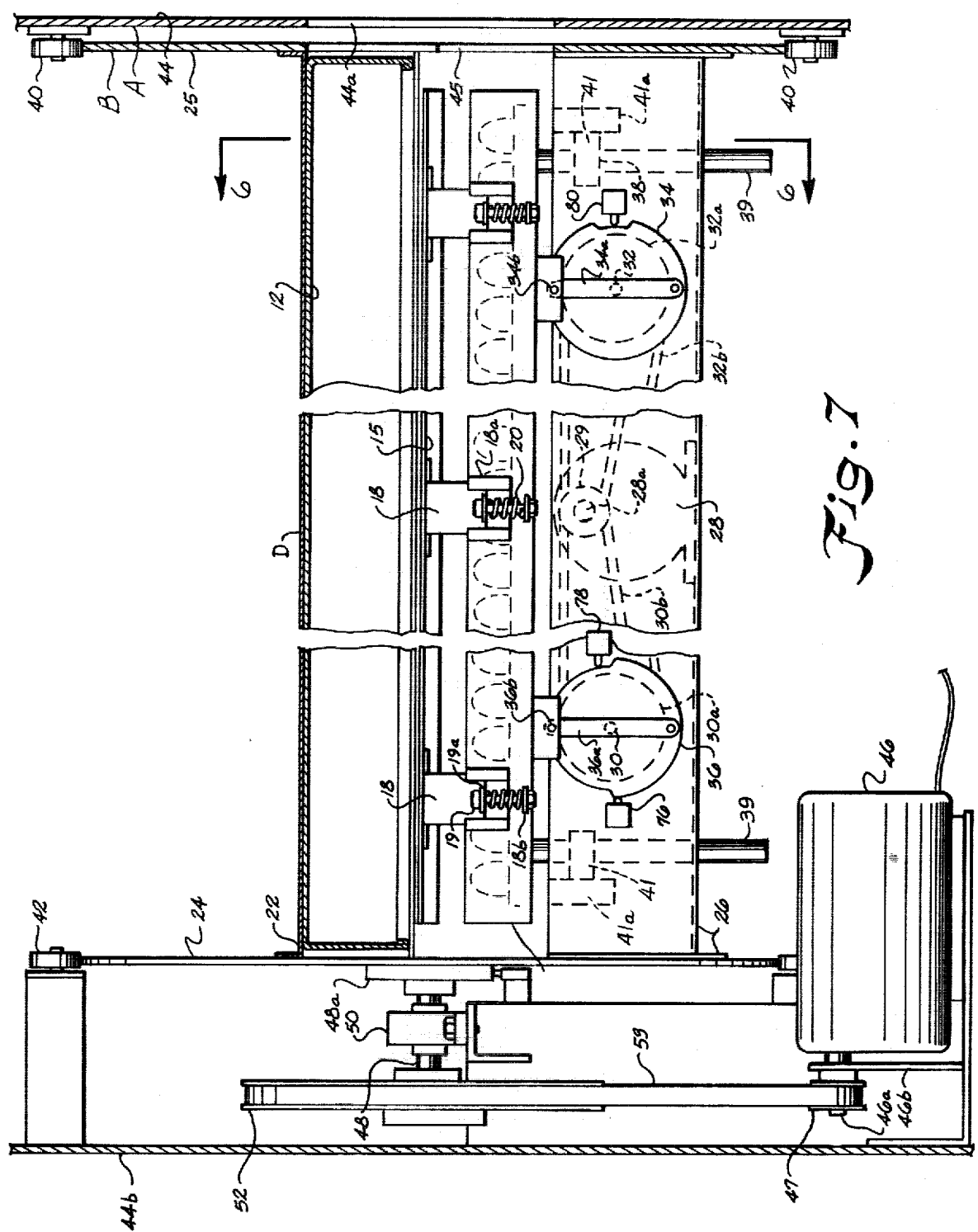
FIG. 7 is a side elevation view illustrating the portions of the main frame of the apparatus to which the secondary rotating frame is attached and parts thereof affixed to the secondary frame according to the invention.

Referring to FIG. 6, it can be seen that a brake means F is provided for positively locking the first drive means by means of clamping engagement with a disk 56 affixed to the end of intermediate drive shaft 32. Disk 56 is clamped between two pads 58 of brake means F which are engaged through actuating lever 60a moving to the left under the force of compression spring 60b. When lever 60a is moved by the force of spring 60b to the left, the pads clamp the disk 56 to brake the shaft 32 and, hence, the first drive means and position of the platform 14 and tray carried thereon. When solenoid 60 is energized, lever 60a moves to the right compressing spring 60b and releasing the brake pads. For purposes of manually releasing the brake should the first drive means mechanism become jammed or for other reasons, a manual release lever 62 is provided which may be pulled to the right to manually release the brake. A suitable brake unit which may be adapted in accordance with the present invention is manufactured by Dayton Electric Manufacturing Company of Chicago, Ill., Model 3M342. The brake unit may be modified by attaching the manual release lever 62 to the lever arm 60a. The brake is controlled in synchronization with motor 28 such that every time the motor is energized, solenoid 60 is energized pulling lever 60a to the compressing spring 60b and releasing the brake. When the motor 28 is de-energized, lever 60a returns to the left under the force of return spring 60b to engage the brake.

The operating sequence of the egg transfer apparatus is as follows. In a start position, the tray carrier means, the full setter tray 10, the empty hatcher tray 12, and the crank plates are in the position as shown in FIG. 2. When the tray motor 28 is energized the eccentric crank plates rotate 180 degrees whereby the setter tray is raised to the egg transfer position as shown in FIG. 3. In this position, the egg retaining rails 15 and 16 are depressed against the upstanding portions 10a of the setter tray 10 subsequent to the trays being turned upside down. Next, drum motor 46 is energized rotating the secondary drum frame B 180 degrees which allows the eggs to be transferred from the setter tray to the hatcher tray 12 as shown in FIG. 4. Subsequently, the tray motor 28 is again energized rotating the crank plates 180 degrees and retracting the platform 14 to its normal position. In this position, the hatcher tray is removed from the carrier housing 22. Finally, the drum motor is again energized rotating the secondary drum frame B in a reverse direction 180 degrees whereby the apparatus assumes its normal start position as shown in FIG. 2.

Figure 8:
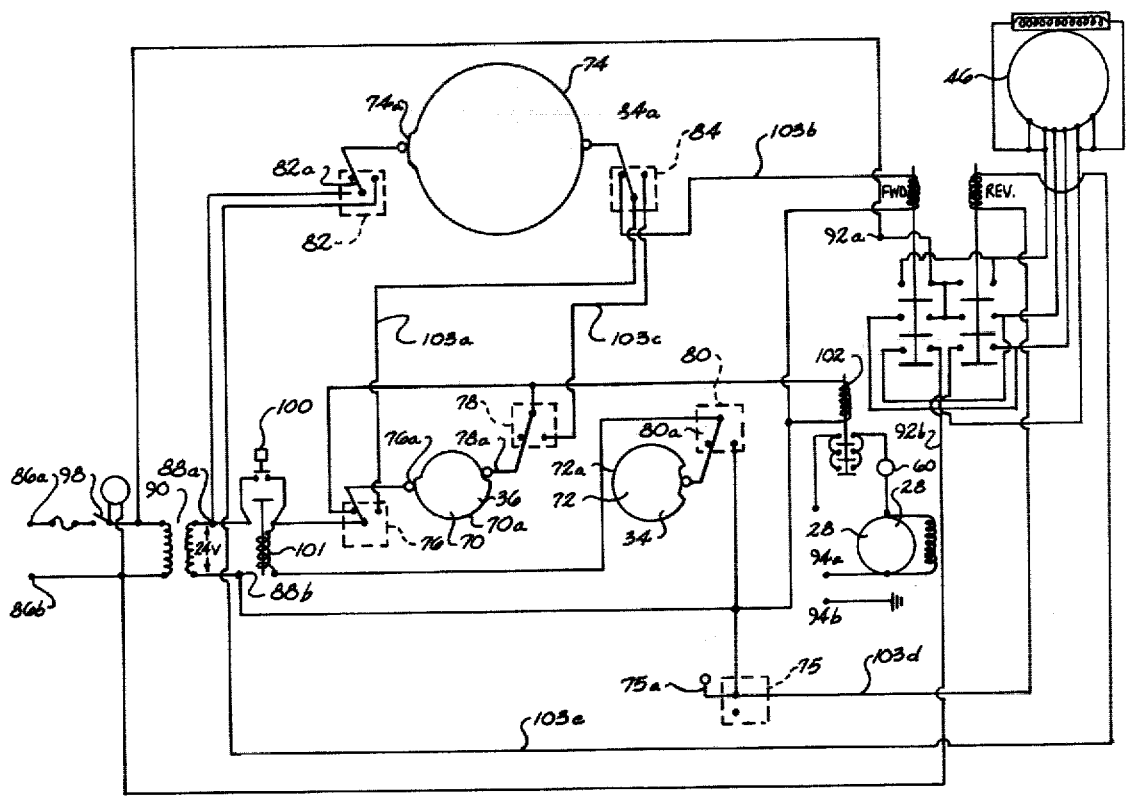
FIG. 8 is a schematic circuit diagram for automatically controlling egg transfer apparatus according to the invention.

Control of the position of tray carried means C is had by control of motor 28 and control of the position of rotating secondary frame B by motor 46. Control of motors 28 and 46 may be had by conventional electrical on-off switches operated by the attendant. However, it is preferred that operation be automatic for reliability and accuracy of tray positioning for egg transfer. For this purpose, a suitable control circuit is illustrated in FIG. 8, although employment and design of any number of control circuits will be within the purview of one skilled in the art. The control circuit and its operation will be described briefly below.

It will first be noted that crank plates 36 and 34 also comprise tray cam plates 70 and 72 affixed to ends of intermediate shafts 30 and 32, respectively, and include cam surfaces 70a and 72a. Drum cam plate 74 is affixed to the rear shaft 24 and includes a cam 74a. Three-way switch 76 is carried adjacent cam plate 70 having a movable switch arm 76a in engagement therewith. A two-way switch 78 is carried adjacent cam plate 70 having a movable switch arm 78a engaging the cam. Two-way switch 80 includes a movable switch arm 80a in engagement with tray cam plate 72. A two-way switch 82 includes a movable switch arm 82a and a three-way switch 84 includes movable switch arm 84a in engagement with drum cam plate 74. Appearing across terminals 86a and 86b is a 115 volt standard source of alternating current which is stepped down to a control voltage V of 24 volts at terminals 88a and 88b by transformer 90. The 115 volts also appear at motor terminals 92 and 94. Two-way tray removal switch 75 is mounted on housing 22 so that movable arm 75a is engaged to open the switch when tray 12 is inserted in the housing. The switch closes when the tray is removed.

In operation and with setter tray 10 and hatcher tray 12 in position, the above described cam plates and switches are in position as shown in FIG. 8. To begin an operation sequence, master switch 98 is closed and start button 100 is pushed energizing relay 90 placing switches 76 and 80 in the control circuit. Start button 100 is held momentarily until cam plate 72 rotates sufficiently so that arm 80a moves out of the depression onto cam surface 72a making a circuit through switch 80 which locks relay 101 on. Voltage V is applied to relay 102 through switch 76 and lead 103 to energize tray motor 28 rotating the crank plates 180 degrees moving platform 14 and setter tray 10 from the start position of FIG. 1 to the egg transfer position of FIG. 2. Movable arm 76a then moves off cam surface 70a and arm 78a engages cam surface 70a. Movable switch arm 80a still engages cam surface 92a. Voltage V is applied to the forward drive terminal of motor 46 via switch 76, lead 103a, switch 84 and lead 103b, energizing the motor and rotating drum frame B 180 degrees until switch arm 84a engages cam 74a opening switch 84 terminating the drive thereof. Transfer of eggs from tray 10 to tray 12 is thus effected in the reverse, upside-down position of frame B.

When arm 84a engages cam 74a and moves to the second switch contact, a circuit is completed through switch 76, lead 103a, lead 103c, switch 78, and lead 103, applies voltage V to relay 102 energizing tray motor 28. The crank plates are rotated 180 degrees to the position shown in FIG. 5. Carrier platform 14 is retracted to its start position. Hatcher tray 12 may then be removed full of eggs. Tray cam plate 72 has been rotated 360 degrees by this time opening the control circuit by arm 72a moving off cam surface 72a into the depression, thus opening relay 101 which opens the entire circuit.

Removal of tray 12 closes tray removal switch 75, previously closed by presence of tray 12, energizing drum motor 46 through lead 103d, the circuit through switch 82 and lead 103. Secondary drum frame B rotates 180 degrees in the reverse direction to its original start position whereupon switch 82 opens by cam 74a terminating the drive thereof. Trays 10 and 12 may then be reloaded and the operational sequence repeated by pushing start button 100.

While a preferred embodiment of the invention has been described using specific terms, such description is for illustrative purposes only, and it is to be understood that changes and variations may be made without departing from the spirit or scope of the following claims.

What is claimed is:

1. Apparatus for transferring eggs from an incubator setter tray having compartments in which eggs are individually contained to a hatcher tray in which said eggs are loosely co-mingled and contained, said apparatus comprising:
   main frame means;
   secondary frame means carried by said main frame means;
   first tray carrier means carried by said secondary frame means for holding said setter tray;
   second tray carrier means carried by said secondary frame means for holding said hatcher tray adjacent said setter tray, said hatcher tray having an open top being positioned by said second tray carrier means to generally co-extend with said setter tray;
   one of said first and second carrier means being carried by said secondary frame means so as to be movable towards the other of said carrier means;
   first drive means for moving said movable carrier means to an egg transfer position relative to said other carrier means;
   said secondary frame means being rotatably carried by said main frame means; and
   second drive means for rotating said secondary frame means to reverse the respective positions of said setter and hatcher trays following movement of said movable carrier means to said egg transfer position.

2. The apparatus of claim 1 wherein said first carrier means includes a platform having spaced upstanding side frames integral with edges of said platform, said side frames having upper marginal edges, tray retaining means carried adjacent said marginal edges for retaining said setter tray during rotation thereof to said reverse position.

3. The apparatus of claim 2 wherein said retaining means includes longitudinal rails carried adjacent said marginal edges extending inwardly towards one another, one of said rails having a lip portion for engaging an upstanding portion of said setter tray when in said reverse position.

4. The apparatus of claim 3 wherein the other of said rails includes an outer edge terminating in a downwardly inclined flange member, said inclined flange member engaging an upstanding portion of said setter tray when in said egg transfer position and affording a release of eggs from said setter tray in said reverse position without interference or hangup from said rail.

5. The apparatus of claim 1 wherein said first carrier means includes a platform having spaced side frames terminating in upper marginal edges, tray retaining rails carried longitudinally extending along said marginal edges, said retaining rails being spring-biased in a vertical direction so as to accommodate placement of said tray on said platform while being depressed against upstanding portions of said setter tray when said setter and hatcher trays are in said egg transfer position so as to retain said setter tray in position when said trays are rotated to said reverse position.

6. The apparatus of claim 5 wherein a first of said retaining rails includes a flange inclined downwardly from an outer edge thereof, a second of said rails including a downwardly inclined flange and lip portion extending past said flange for positively engaging tray portions, said setter tray being wedges between said inclined flanges by said upstanding portion being engaged thereby, and said rail being on the lower rotational side of said setter tray to provide release of eggs from said setter tray in said reverse position without hang up and interference.

7. The apparatus of claim 1 including a brake for positively locking said first drive means and said movable carrier means in said egg transfer position, said brake having a manual release whereby said brake may be released to adjust the drive means and position of said movable carrier means manually.

8. The apparatus of claim 1 wherein the first drive means includes a motor having an output drive shaft, a drive sprocket affixed to said output shaft, a pair of spaced intermediate drive shafts carried by said secondary frame means having driven sprockets affixed thereon, a drive chain connecting said drive sprocket and said driven sprockets, and eccentric crank means connecting said intermediate drive shafts and said movable carrier means for effecting vertical movement of said movable carrier means.

9. The apparatus of claim 1 wherein said first drive means includes a chain and sprocket drive connected between a motor and said first carrier means effecting positive and reliable positioning of said setter tray in said egg transfer position avoiding midpositioning and resulting jamming.

10. The apparatus of claim 1 wherein said first drive means includes a motor and said apparatus includes brake means which brakes said first drive means in response to de-energization of said motor.

* * * * *